Nov. 30, 1943.　　　F. HINRICHS　　　2,335,414
ART OF COUPLING
Filed Feb. 24, 1941　　　2 Sheets-Sheet 2
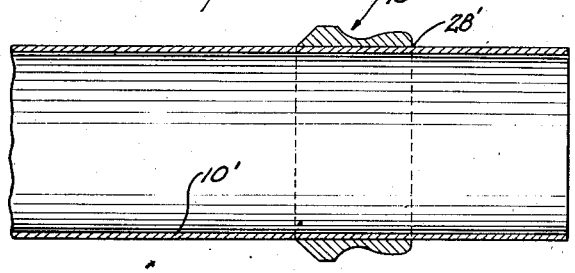
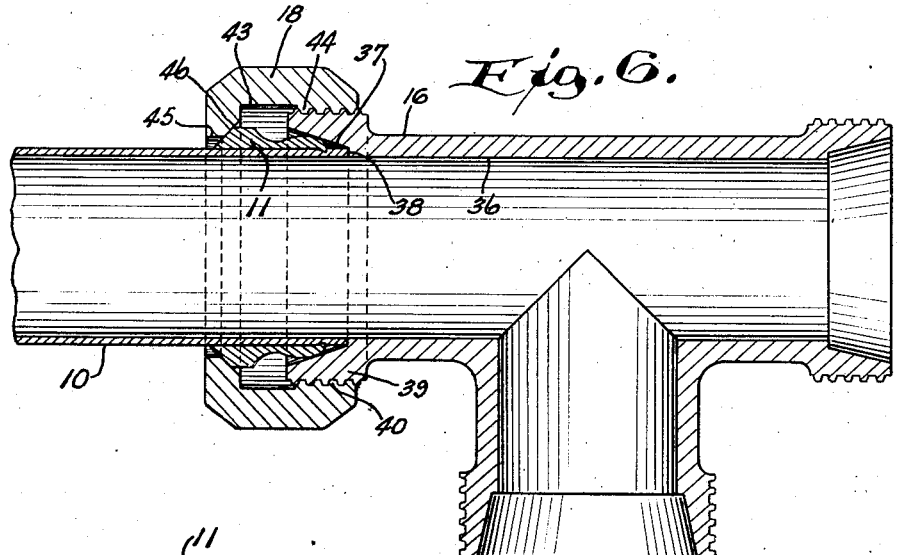
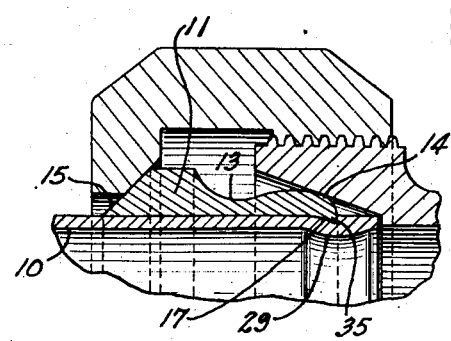
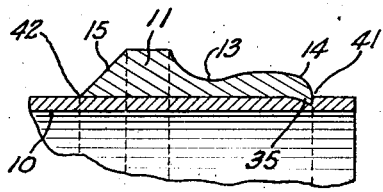
INVENTOR
Ferdinand Hinrichs,
BY
Morsell & Morsell
ATTORNEYS.

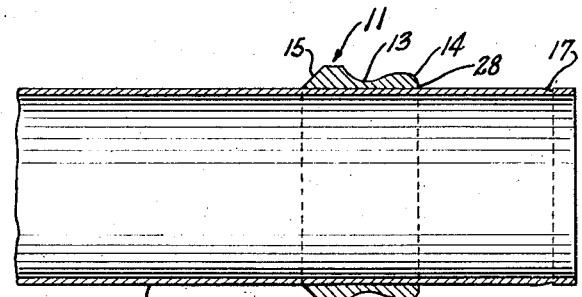
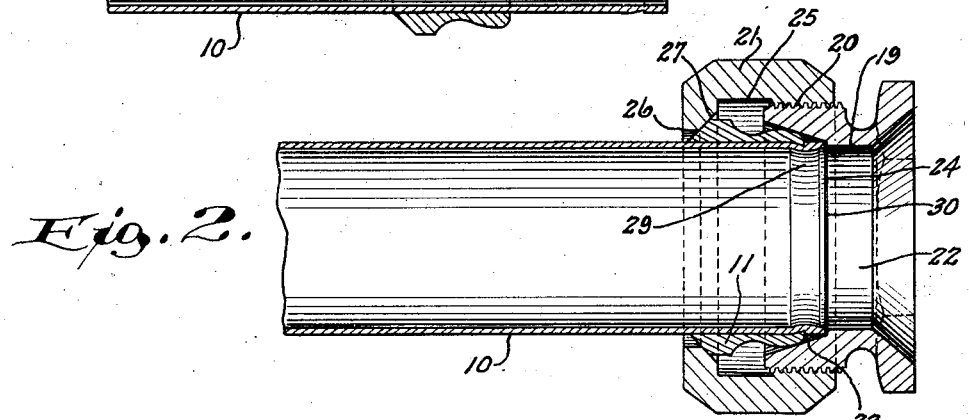
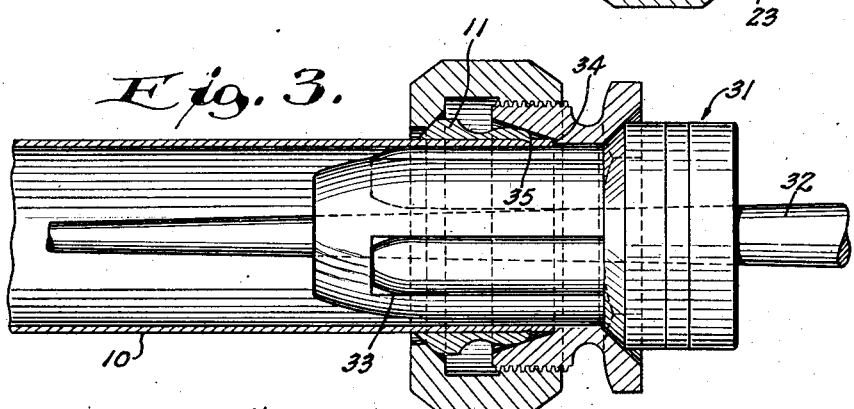
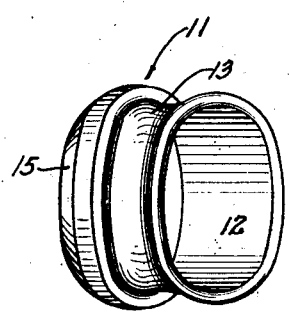

Patented Nov. 30, 1943

2,335,414

UNITED STATES PATENT OFFICE 2,335,414

ART OF COUPLINGS

Ferdinand Hinrichs, Kenosha, Wis., assignor to Tri-Clover Machine Company, Kenosha, Wis., a corporation of Wisconsin Application February 24, 1941, Serial No. 380,093

3 Claims. (Cl. 29—148.2)

This invention relates to improvements in the art of couplings.

In the installation of pasteurizing equipment as well as other equipment wherein tubular conduits are used, it is desirable and usualy necessary to couple adjacent conduit ends while on the job and at a point in the length of a conduit which cannot be determined in advance. When the equipment is for pasteurizing or like uses wherein sanitation is a factor, various problems are present in effecting a suitable connection:

First, the coupling must be such that it can be effected without extensive equipment;

Second, the coupling must present a smooth interior bore without projections or pockets to trap particles which might contaminate material flowing through the conduit;

Third, the coupling must be of a nature to permit quick disassembly for daily cleaning;

Fourth, the individual parts of the coupling must have all portions accessible for thorough cleaning;

Fifth, the coupling must provide for a tight, leakproof connection while utilizing thin-walled tubing;

Sixth, the coupling ferrule must be tight at both ends of the tube both when the coupling is assembled and disassembled to prevent material from entering between the exterior of the tube and the ferrule bore.

Heretofore couplings have been proposed for use in making permanent connections with thick-walled tubing wherein in tightening up the union nut the sharp, hard edge of ring or ferrule is caused to shear into the exterior of one of the tubes to raise a ridge thereon, the metal of the shearing edge being harder than the metal of the thick-walled tube. If this type of construction were used with thin-walled tubing, such as is employed commonly in pasteurizing equipment, it would cause the interior surface of the wall of the bore of the tube to be permanently bowed inwardly, which would be objectionable for sanitary purposes as would the ridge which is raised on the outside of the tube. Furthermore, while with prior methods the ferrule holds tightly onto the tube as long as it is retained in tight condition by the union nut, it nevertheless has a tendency to spring outwardly into relatively loose condition when the union nut is removed. This is objectionable for pasteurizing installations because the ferrule would be in relatively loose condition while being cleaned and yet it would not be possible to effectively clean between the bore of the ferrule and the exterior of the tube. In addition, in that type of prior art wherein the inner end of the ferrule is stepped or notched to form a sharp shearing edge there is a depression at the end of the ferrule which is objectionable from the sanitary standpoint.

It is therefore one of the objects of the present invention to provide improvements in the art of couplings and more particularly an improved method of effecting a coupled connection wherein a coupling may be readily made during installation after the conduit sections have been cut to desired length; wherein the coupling ferrule is so secured to a conduit section that it fits tightly at each end both when engaged by the union nut as well as when the union nut is disengaged for cleaning; and wherein there is a smooth interior bore adjacent the junction of the connected tubular members.

A more specific object of the invention is to provide a method of effecting couplings comprising inserting a ferrule on the end of a thin-walled tube, compressing a leading portion of said ferrule to cause the same to bow the inner surface of the wall of the tube inwardly on a line extending around the bore of the tube, and expanding the tube from the inside while the ferrule is held in compressed condition to smooth out the interior of the tube and effect a tight permanent connection between the tube and the ferrule.

A further object of the invention is to provide a method as above described, including the preliminary step of pre-notching the tube on a line extending around the exterior periphery of said tube, the leading portion of the ferrule being compressed into said notch to bow the tube inwardly therebeneath.

A further object of the invention is to provide a coupling comprising a fixed member having a bore and having a flare at one end of said bore, a tube inserted in said flared end, a ferrule on said tube, and means connecting the tube with said fixed member engageable with said ferrule and serving to force said ferrule against said flared surface to compress a leading portion of the ferrule into the tube, there being a permanent interlock between the ferrule and the tube formed by metal of the tube which has been expanded outwardly against the ferrule while the latter has been maintained in compressed condition against the tube.

A more specific object of the invention is to provide a coupling as above described wherein the tube has a preformed peripheral groove or notch with which a leading portion of the ferrule engages.

With the above and other objects in view the invention consists of the improvements in the art of couplings and all its parts and combinations, as set forth in the claims, and all equivalents thereof.

In the accompanying drawings illustrating preferred embodiments of the invention in which the same reference numerals designate the same parts in all of the views, Fig. 1 is a longitudinal sectional view taken through the end portion of a tube to be connected showing the ferrule loosely positioned thereon;

Fig. 2 is a longitudinal sectional view showing the condition of the parts after the leading portion of the ferrule has been compressed to bow the tube inwardly;

Fig. 3 is a similar view showing the condition of the parts after the metal of the tube has been re-expanded;

Fig. 4 is a perspective view of the ferrule alone;

Fig. 5 is a view similar to Fig. 1 illustrating a modification wherein the tube is not pre-grooved or notched;

Fig. 6 is a longitudinal sectional view through a completed coupling assembly;

Fig. 7 is a fragmentary longitudinal sectional view on an enlarged scale showing the position of the parts after the operation of Fig. 2 has been performed; and Fig. 8 is a fragmentary longitudinal sectional view on an enlarged scale showing the ferrule permanently coupled to the tube with the union nut removed.

Referring more particularly to the drawings, the numeral 10 designates a section of thin-walled tubing of the type used in pasteurizing equipment. This type of tubing is usually formed of stainless steel, nickel, or a copper-nickel alloy. Positioned slidably on the tube in Fig. 1 is a ferrule 11, preferably formed of the same material as the tube. The ferrule 11 may have a smooth straight bore, as at 12, and on the exterior it is preferably thinned out in the middle as at 13. The leading upper corner of the ferrule is rounded or angled, as at 14, and the rear edge of the ferrule is tapered, as at 15.

In effecting a coupled connection between this tube and a suitable tubular fitting, such as the fitting 16 of Fig. 6, it is preferred to first form a peripheral groove or notch 17 in the exterior of the tube adjacent the end, as shown in Fig. 1. This groove or notch may be formed on the job with any suitable tool adapted for this purpose. In effecting a coupling it is necessary that the ferrule be permanently connected to the tube. This may be accomplished by inserting the end of the tube 10 into the member 16 or other part to which the tube is to be coupled and by then using the regular union nut 18 of Fig. 6 to compress a leading portion of the ferrule into the notch 17. It is, however, preferable to furnish installation men with master fittings, such as the fitting 19 of Fig. 2, formed of hard, durable metal and having finer threading 20 than the threading of the fitting 16 of Fig. 6. It is also preferred to use a special master union nut 21 also made of hard, durable metal and provided with fine threading to cooperate with the threading 20 of the master fitting 19. By using the master fitting and union nut to originally compress the ferrule, greater leverage can be obtained due to the fine threading at 20.

The master fitting 19 has a bore 22 communicating with a flared mouth 23, there being an annular shoulder 24 between the bore and the flare. The tube 10 of Fig. 1 is inserted into the flared mouth 23 of the fitting 19, and the ferrule 11 is pushed forwardly until it enters the mouth 23 of the fitting 19. Next the master union nut 21, which has been slipped onto the opposite end of the tube 10, is engaged with thread 20 of the fitting 19 and tightened up. The union nut has a main bore 25, part of which is provided with the threading, and a smaller outer end bore 26, there being an annular tapered surface 27 between the bores 26 and 25 which engages the annular taper 15 on the rear end of the ferrule, as shown in Fig. 1, when the union nut is tightened. As the union nut is drawn up, the tapered portion 27 pushing against the ferrule taper 15 causes the leading lower corner 28 to engage with the notch 17. Simultaneously the action of the tapered mouth 23 of the fitting 19 acting against the rounded leading upper corner 14 of the ferrule causes the ferrule to be compressed into the notch or groove 17 to bow the tube inwardly, as shown at 29 Figs. 2 and 7, on a line extending around the bore of the tube on the inner surface of the tube wall. The leading portion of the ferrule can be bent inwardly more readily because of the thinned out center 13 of the ferrule after the union nut has been drawn up tightly, and due to the position of the cooperating tapers there is a slight spacing between the end of the tube and the shoulder 24 of the fitting 19, as indicated at 30.

The next step in effecting a suitable connection between the ferrule and tube is to insert an expander into the bore 22 of the master fitting 19 and into the tube 10 while the parts are in the position of Fig. 2. This expander may be of any suitable type, such as the expander 21 shown in Fig. 3, having a tapered plunger 32 which is moved longitudinally within the expander to force the expanding rollers 33 radially outwardly while the expander 31 is rotating. This expanding is an essential step not only for the purpose of smoothing out the inwardly bowed part 29 of the tube 10 but also to render the connection between the ferrule and the tube 10 permanent and tight at both ends. During the expanding operation the inwardly bowed metal is caused to flow longitudinally in both directions, and this longitudinal flowing closes up the space 30 of Fig. 2 so that the end of the tube is tight against the shoulder 24 of the master fitting 19, as at 34 in Fig. 3. Also the exterior surface of the tube within the ferrule is expanded tightly against the bore of the ferrule so that there is a seal throughout the length of said bore between the tube and ferrule and so that there is a tight interlock between the downwardly curled lip 35 of the ferrule and the notch in the tube, with the metal adjacent the notch pressing tightly against the lip 35 to prevent material from entering between the exterior of the tube and the bore of the ferrule.

The master union nut may then be disconnected from the master fitting 19 and after said disconnection, because of the expanded connection between the tube and ferrule, there will be no loosening of the ferrule from the tube such as takes place in other couplings of this general type. After the master fitting and union nut are removed the connection between the ferrule and tube will appear as shown in Fig. 8. The ferrule has, therefore, been permanently attached to the tube and the tube may then be coupled to any required fitting for installation purposes, such as the fitting 16 of Fig. 6.

The fitting 16 of Fig. 6 has a bore 36 of the same diameter as the bore of the tube 10 which is to be connected thereto, and said bore 36 communicates with a flared mouth 37. There is a shoulder 38 between the bore 36 and the flared mouth 37 against which the end of the tube 10 engages to limit inward movement. Surrounding the flared mouth 37 the external diameter of the fitting 16 may be enlarged as at 39 and threaded as at 40 for cooperation with the union nut 17 in the usual manner.

The coupling of Fig. 6 may be disconnected as frequently as desired for cleaning purposes, and during such cleaning as well as during use no material can enter between the exterior of the tube 10 and the bore of the ferrule 13. The ferrule is permanently connected to the tube and stays on during the cleaning. It is apparent by reference to Fig. 8 that during cleaning or use no dirt can enter at points 41 and 42 because there are no unfilled recesses in the tube and no recesses or notches in the ends of the ferrule. The extremely tight connection is the result of the expanding step after the ferrule has been compressed.

The union nut 17 used in the final coupling is similar to the master union nut 21, except that the threading is less fine and the metal does not need to be as hard as the metal of the master union nut. The union nut 17 has a main bore portion 43 leading to the threading 44 and has a smaller outer end bore portion 45 with an annular tapered surface 46 leading from the bore portion 45 to the bore portion 43. The annular tapered portion 46 cooperates with the tapered portion 15 on the rear end of the ferrule in the manner shown in Fig. 6.

It is apparent that an improved coupling has been provided which differs from couplings of similar type in that there are no ridges on the exterior of the tube to catch dirt; in that there are no notches at the ends of the ferrule to catch dirt; in that the ferrule after being connected is so tightly united to the tube because of the compressing and re-expanding that the ferrule does not spring loose after the union nut is removed. Thus the improved coupling is admirably suited for use in connection with pasteurizing equipment wherein daily cleaning is a necessity and wherein other couplings of this general type could not be employed. It is also apparent that after the expansion step, the inner surface of the tube is smooth so that there are no ridges or projections to trap material flowing through the conduit.

As shown in the modification of Fig. 5, the coupling may also be effected without pre-notching the tube as at 17 of Fig. 1. In this form of the invention the leading corner portion 28' of the ferrule 15' is compressed into the metal of the tube at the same place where the notch would otherwise be provided, and the same identical method is used, the metal of the tube being first bowed inwardly along the line of pressure and the metal of the tube being later re-expanded by the same procedure shown in Fig. 3. The use of a method, however, including the preformed notch has been found to be preferable.

Although only a few forms of the assemblage have been shown and described, various changes and modifications may be made without departing from the spirit of the invention, and all of such changes are contemplated as may come within the scope of the claims.

What I claim is:

1. The method of making a coupling between two tubes of the same inside diameter comprising, sliding a ring of metal on to the end of one tube, applying external inward pressure around a portion of the periphery of said ring to compress a part of the ring spaced from the end of the tube into the tube and to cause the wall of the tube to be bowed inwardly on a line extending around the tube bore while maintaining the extreme end of the tube in its original condition, then after the application of inward pressure has been completed and while the ring and tube are held in compressed condition expanding the inwardly bowed portion of the metal of the tube from the inside to an extent no greater than is necessary to return the previously bowed portion of the inside bore of the tube to smooth condition and to an inside diameter substantially equal to its original diameter and substantially equal to the diameter of the extreme end of the tube, and then coupling the two tubes together by a coupling which engages said ring while the ends of the bores of the two tubes are in alinement to form a smooth interior surface at the joint.

2. The method of making a coupling between two tubes of the same inside diameter comprising, sliding a ring of metal onto the end of one tube, inserting the end of the tube into a fitting having a flared mouth engageable with a portion of the ring of metal but with the flared portion of the mouth not in engagement with the end of the tube, inserting a union nut having threaded cooperation with said fitting onto the tube over the ring, drawing the union nut up on the fitting to cause a leading portion of the metal ring to be compressed into the metal of the tube in a position spaced from the end of the tube and to cause the wall of the tube to be bowed inwardly on a line extending around the tube bore while maintaining the extreme end of the tube in its original condition, then after the application of inward pressure has been completed and while the ring and tube are held in compressed condition, expanding the inwardly bowed portion of the metal of the tube from the inside to an extent no greater than is necessary to return the previously bowed portion of the inside bore of the tube to a smooth condition and to an inside diameter substantially equal to its original diameter and substantially equal to the diameter of the extreme end of the tube, removing the union nut and fitting, and then coupling the two tubes together by a coupling which engages said ring while the ends of the bores of the two tubes are inalinement to form a smooth interior surface at the joint.

3. The method of forming a ferrule on the end of a tube to use in effecting a coupling comprising, sliding a ring of metal onto the end of the tube, applying inward pressure around a portion of the periphery of said ring to compress a part of the ring spaced from the end of the tube into the tube and to cause the wall of the tube to be bowed inwardly on a line extending around the tube bore while maintaining the end of the tube in its original condition, then after the application of inward pressure has been completed and while the ring and tube are held in compressed condition, expanding the inwardly bowed portion of the metal of the tube from the inside to an extent no greater than is necessary to return the previously bowed portion of the inside bore of the tube to a smooth condition and to an inside diameter substantially equal to its original diameter and substantially equal to the diameter of the extreme end of the tube.

FERDINAND HINRICHS.